(12) United States Patent
McDevitt et al.

(10) Patent No.: US 11,074,613 B2
(45) Date of Patent: Jul. 27, 2021

(54) METHODS AND SYSTEMS FOR EVALUATING THE DISPLAY OF ELECTRONIC CONTENT TO INDIVIDUALS IN GEOGRAPHIC ZONE HAVING INNER BOUNDARY

(71) Applicant: AOL Inc., Dulles, VA (US)

(72) Inventors: Patrick McDevitt, Hanover, NH (US); Joseph Hughes, Lancaster, PA (US)

(73) Assignee: Verizon Media Inc., New York, NY (US)

( * ) Notice: Subject to any disclaimer, the term of this patent is extended or adjusted under 35 U.S.C. 154(b) by 886 days.

(21) Appl. No.: 14/310,874

(22) Filed: Jun. 20, 2014

(65) Prior Publication Data
US 2015/0371270 A1    Dec. 24, 2015

(51) Int. Cl.
*G06Q 30/02* (2012.01)
*H04W 4/021* (2018.01)
(Continued)

(52) U.S. Cl.
CPC ..... *G06Q 30/0261* (2013.01); *G06Q 30/0267* (2013.01); *H04L 67/20* (2013.01);
(Continued)

(58) Field of Classification Search
None
See application file for complete search history.

(56) References Cited

U.S. PATENT DOCUMENTS 8,315,905 B1 * 11/2012 Adair ................. G01C 21/3679
379/93.12
10,733,673 B1 * 8/2020 Slusar ..................... G08G 1/22
(Continued)

OTHER PUBLICATIONS

Knoop, V. L. et al. (2012) 'Automated lane identification using precise point positioning an affordable and accurate GPS technique', 2012 15th International IEEE Conference on Intelligent Transportation Systems, 2012 15th International IEEE Conference on, pp. 939-944. doi: 10.1109/ITSC.2012.6338761 (Year: 2012).*

(Continued)

*Primary Examiner* — Michael Bekerman
*Assistant Examiner* — Scott Snider
(74) *Attorney, Agent, or Firm* — Bookoff McAndrews, PLLC

(57) ABSTRACT

Systems and methods are disclosed for electronic distribution of electronic content. The method includes retrieving data indicating transmission of electronic content to a plurality of electronic devices within a geographical zone extending between an inner boundary extending around a target location and an outer boundary extending around the target location; receiving data indicating presence of one of the plurality of electronic devices in a target geographical zone, the target geographical zone being located within the inner boundary; determining a time difference between transmission of the electronic content to the one of the plurality of electronic devices and the one of the plurality of electronic devices' presence in the target geographical zone; and determining an electronic device conversion occurred when the time difference is less than a threshold period of time associated with the electronic content.

20 Claims, 8 Drawing Sheets

(51) Int. Cl.
*H04L 29/08* (2006.01)
*H04W 4/02* (2018.01)
*H04W 4/029* (2018.01)

(52) U.S. Cl.
CPC .............. *H04L 67/22* (2013.01); *H04L 67/24* (2013.01); *H04L 67/289* (2013.01); *H04W 4/021* (2013.01); *H04W 4/022* (2013.01); *H04W 4/023* (2013.01); *G06Q 30/0242* (2013.01); *H04L 67/306* (2013.01); *H04W 4/027* (2013.01); *H04W 4/029* (2018.02)

(56) References Cited

U.S. PATENT DOCUMENTS

| | | | |
|---|---|---|---|
| 2002/0102993 A1* | 8/2002 | Hendrey | G06Q 10/00 455/456.3 |
| 2008/0097686 A1* | 4/2008 | Takeuchi | G08G 1/0104 701/117 |
| 2010/0153216 A1* | 6/2010 | Liang | G06Q 30/0259 705/14.57 |
| 2010/0318701 A1* | 12/2010 | Srinivasan | G06Q 10/10 710/104 |
| 2013/0103307 A1* | 4/2013 | Sartipi | H04W 4/021 701/465 |
| 2014/0156410 A1* | 6/2014 | Wuersch | G06Q 30/0261 705/14.58 |
| 2014/0309849 A1* | 10/2014 | Ricci | G01C 21/26 701/33.4 |
| 2015/0006712 A1* | 1/2015 | Khann | H04L 67/18 709/224 |
| 2015/0058127 A1* | 2/2015 | Abuelsaad | G09F 21/048 705/14.63 |
| 2017/0032402 A1* | 2/2017 | Patsiokas | G06Q 30/0261 |

OTHER PUBLICATIONS

Sharp, J.E., 2012. An analysis of mobile location based services & advertising (Year: 2012).*

Abhishek, V., Fader, P. and Hosanagar, K., 2012. Media exposure through the funnel: A model of multi-stage attribution. Available at SSRN 2158421. (Year: 2012).*

* cited by examiner

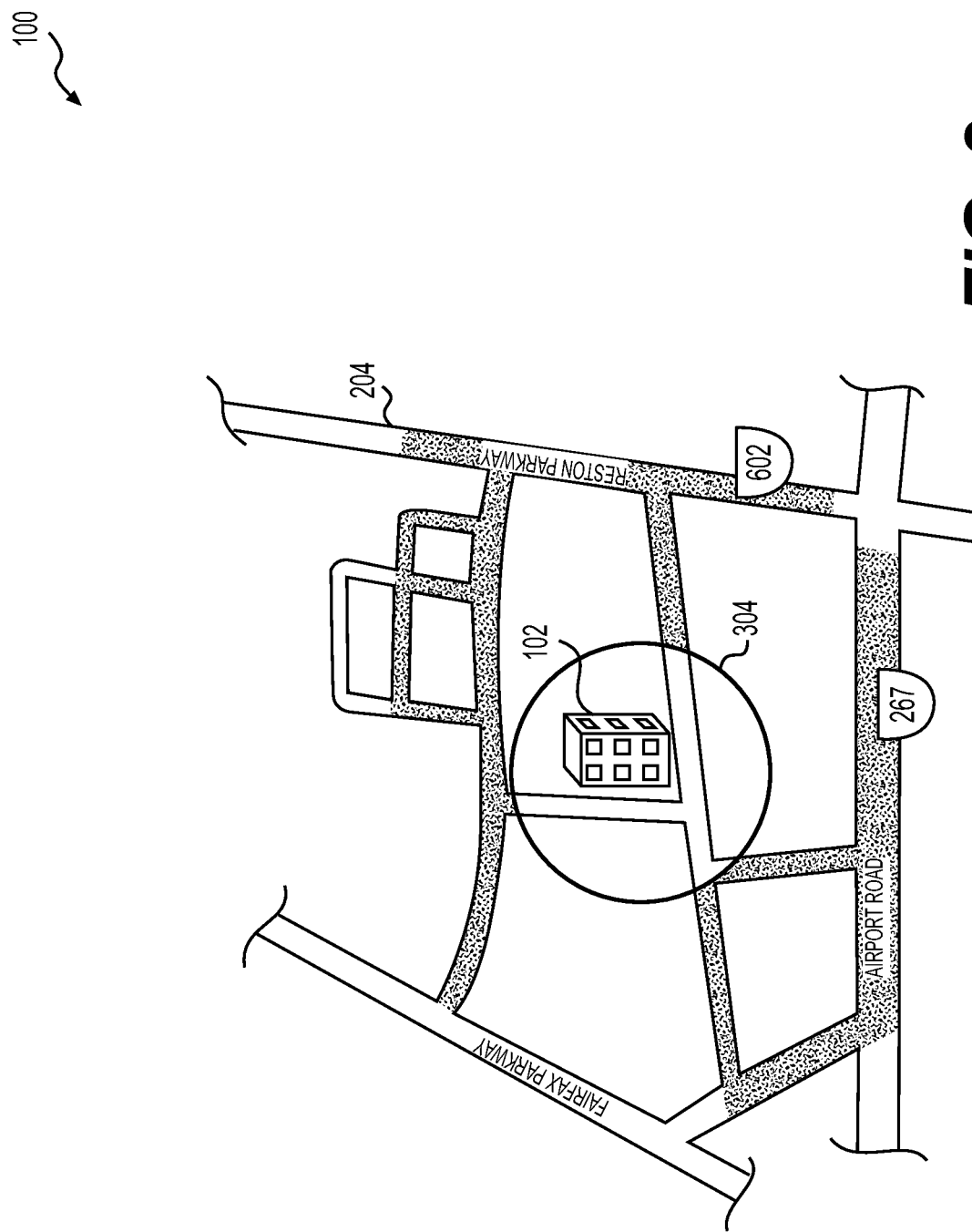

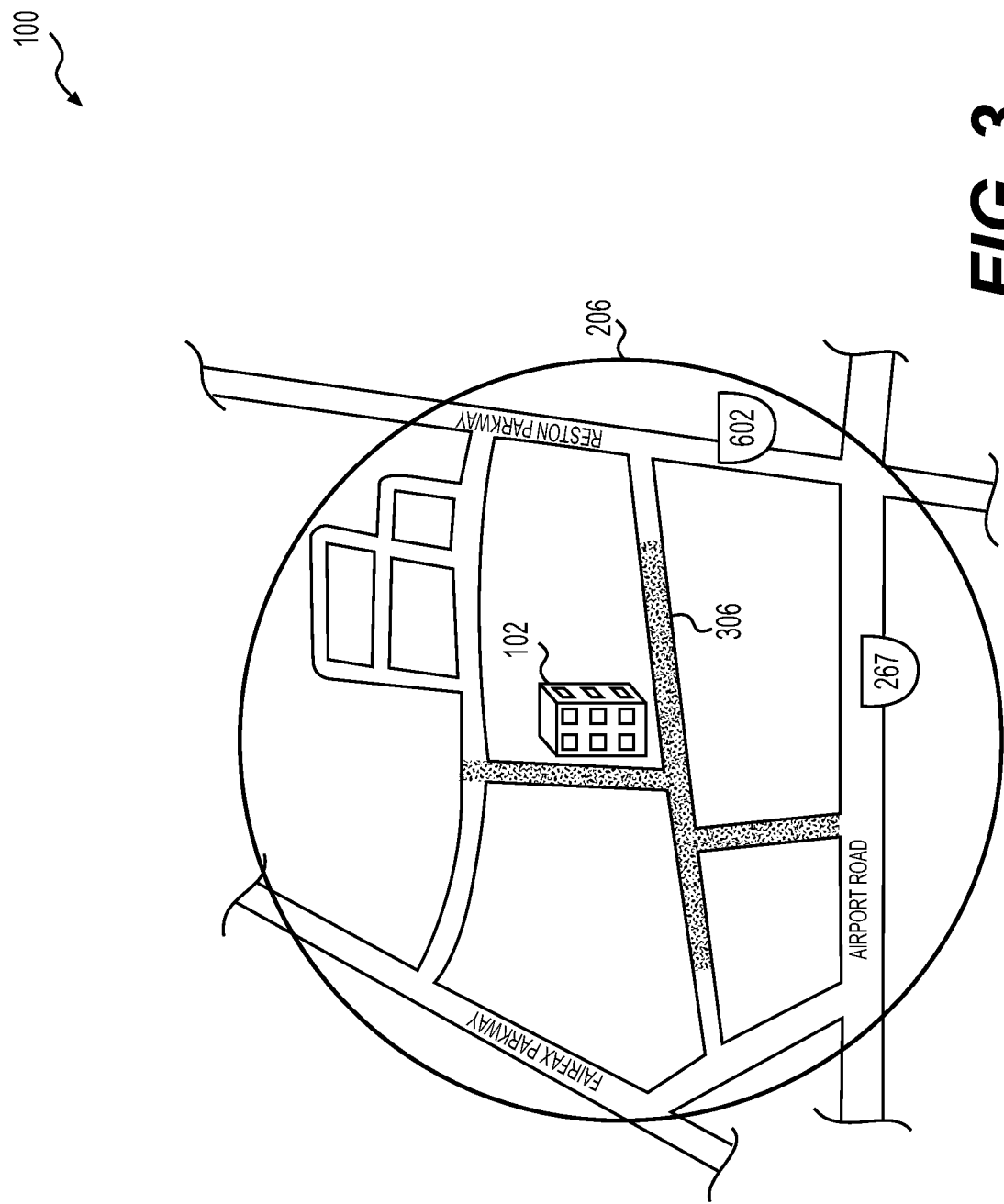

METHODS AND SYSTEMS FOR EVALUATING THE DISPLAY OF ELECTRONIC CONTENT TO INDIVIDUALS IN GEOGRAPHIC ZONE HAVING INNER BOUNDARY

TECHNICAL FIELD

Various embodiments of the present disclosure relate generally to providing electronic content based on geographical mapping information. More specifically, exemplary embodiments of the present disclosure relate to systems and methods for providing targeted electronic content to individuals in a geographic region having an inner boundary and evaluating the targeted electronic content.

BACKGROUND

Recently, the use of electronic maps has become widespread through the use of in-vehicle or portable global positioning system ("GPS") devices, mobile devices, and other electronic devices. These electronic maps often convey information about roads, traffic, buildings, landmarks, terrain, etc., related to geographical regions of interest. Some electronic maps may be interactive, allowing users, for example, to view their current location on a map of a particular area and the surrounding areas. Many providers of electronic mapping services allow users to input origin and destination locations and provide various routing directions to and from those locations. The routing directions may be generated based on one or more of travel time, travel distance, traffic, construction, rout preference (e.g., tolls, highways, etc.), and time-of-day. Electronic map providers may determine and update routing information based on a user's location using GPS or other location detecting means transmitted via a signal emitted by a user's electronic device. Based on this location information, the electronic maps may provide users with real-time information, such as live traffic information and dynamic routing adjustments.

Electronic content providers, such as advertisers and content publishers, also have been using various methods to send electronic content to users. Such conventional methods include sending email messages, presenting banner ads on websites, sending text messages, presenting pop-up ads, placing ads in online search results, etc. These content providers have found that users are more likely to view and act on content (e.g., redeem a coupon, click on an ad, etc.) if the content is relevant or otherwise tailored to them. Therefore, increasingly, content providers have been seeking and using content targeting methods based on various attributes of a user. For example, content providers target users based on a user's web browsing history, etc.

Some online content providers, such as advertisers and content publishers, have been sending targeted content to users' electronic devices based on the physical location of the user by, e.g., analyzing the IP address and other user information (e.g., search history, cookies, etc.) transmitted or retrievable from a user's electronic device, sometimes in the context of an electronic mapping application. For example, many online advertisers and publishers deliver electronic content (such as ads and multimedia) to users' devices based on IP address-based inferences of each user's general location, e.g., which city or country they are predicted to be in. However, such methods are coarse, in that they do not target content based on information more granular than the general area or region where the user is located. Such methods are also susceptible to location misdirection based on user tools such as virtual environments or desktops, and IP address detection blocking. As a result, other methods for geographically targeted ads and content have been developed based on more granular levels of targeting. For example, businesses may "push" ads and/or content to users' devices when the user enters and connects to a Wi-Fi and/or Bluetooth network operated by the business. However, such methods are quite limited by the relatively short reach of the wireless network employed. Such methods are unable to reach a sufficiently large local audience that is within a desired area for making a decision to patronize the business.

Other online content providers target users within a predetermined geographic zone so that users within the zone receive the targeted content. For example, some online content providers detect the presence of an electronic device user within a certain radius of a target location, or encourage users to inform the content provider of their presence by "checking-in," and then send the user an ad or other electronic content. These radius or other geographic based methods of providing electronic content may be arbitrary and may not account for variations (e.g., the presence of the advertised goods, services, point-of-interest ("POI"), or target location) within different geographic regions. This may result in the electronic content being provided to too few or to too many users.

Specifically, these predetermined geographic zones, commonly referred to as geo-fences or geofences, are digital, virtual boundaries having a predetermined size. Electronic content providers, such as national advertisers, often approach geographic targeting by constructing the same size radius geofence around each of their properties (e.g., a 2-mile radius around every store). While this is simple for the advertiser, it can sometimes involve delivery of electronic content, e.g., advertising, to individuals that have either: (i) already decided to, or already started, patronizing the advertised venue or service, or (ii) are close enough to the advertised venue or service to be within visible sight of the advertised venue or service, and therefore within its region of influence. For example, existing geofences might result in advertising a restaurant promotion to an individual who is already moments away from, or currently at, the restaurant advertising the promotion. Likewise, existing geofences might result in advertising a promotion to an individual who is within eyesight of the restaurant advertising the promotion, and therefore unlikely to benefit from further advertising of the promotion.

Accordingly, a need exists for methods and systems of providing improved dynamic targeting of electronic content based on other factors, for example, a geographic zone having an inner boundary and an outer boundary.

SUMMARY

According to certain embodiments, systems and methods are disclosed for detecting a conversion of electronic content. One method may include retrieving data indicating transmission of electronic content to a plurality of electronic devices within a geographical zone extending between an inner boundary extending around a target location and an outer boundary extending around the target location. The method further comprises receiving data indicating presence of one of the plurality of electronic devices in a target geographical zone, the target geographical zone being located within the inner boundary. Additionally, the method comprises determining a time difference between transmission of the electronic content to the one of the plurality of electronic devices and a presence of the one of the plurality of electronic devices in the target geographical zone, and determining that an electronic device conversion occurred when the time difference is less than a threshold period of time associated with the electronic content.

According to certain embodiments, systems are disclosed for detecting a conversion of electronic content. One system includes a data storage device storing instructions and a processor configured to execute the instructions to perform a method. The method may include retrieving data indicating transmission of electronic content to a plurality of electronic devices within a geographical zone extending between an inner boundary extending around a target location and an outer boundary extending around the target location. The method further comprises receiving data indicating presence of one of the plurality of electronic devices in a target geographical zone, the target geographical zone being located within the inner boundary. Additionally, the method comprises determining a time difference between transmission of the electronic content to the one of the plurality of electronic devices and the one of the plurality of electronic devices' presence in the target geographical zone, and determining an electronic device conversion occurred when the time difference is less than a threshold period of time associated with the electronic content.

According to certain embodiments, a non-transitory computer-readable medium storing instructions is disclosed. The instructions when executed by a computer system cause the computer system to perform a method including retrieving data indicating transmission of electronic content to a plurality of electronic devices within a geographical zone extending between an inner boundary extending around a target location and an outer boundary extending around the target location. The method further comprises receiving data indicating presence of one of the plurality of electronic devices in a target geographical zone, the target geographical zone being located within the inner boundary. Additionally, the method comprises determining a time difference between transmission of the electronic content to the one of the plurality of electronic devices and the one of the plurality of electronic devices' presence in the target geographical zone, and determining an electronic device conversion occurred when the time difference is less than a threshold period of time associated with the electronic content.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 is an illustration of an electronic map overlaid by another type of geofence or geographic zone having an outer boundary and an inner boundary, according to an exemplary embodiment of the present disclosure;

FIG. 3 is an illustration of an electronic map overlaid by another type of geofence or geographic zone having an outer boundary and an inner boundary, according to an exemplary embodiment of the present disclosure;

DESCRIPTION OF THE EMBODIMENTS

Figure 1A:
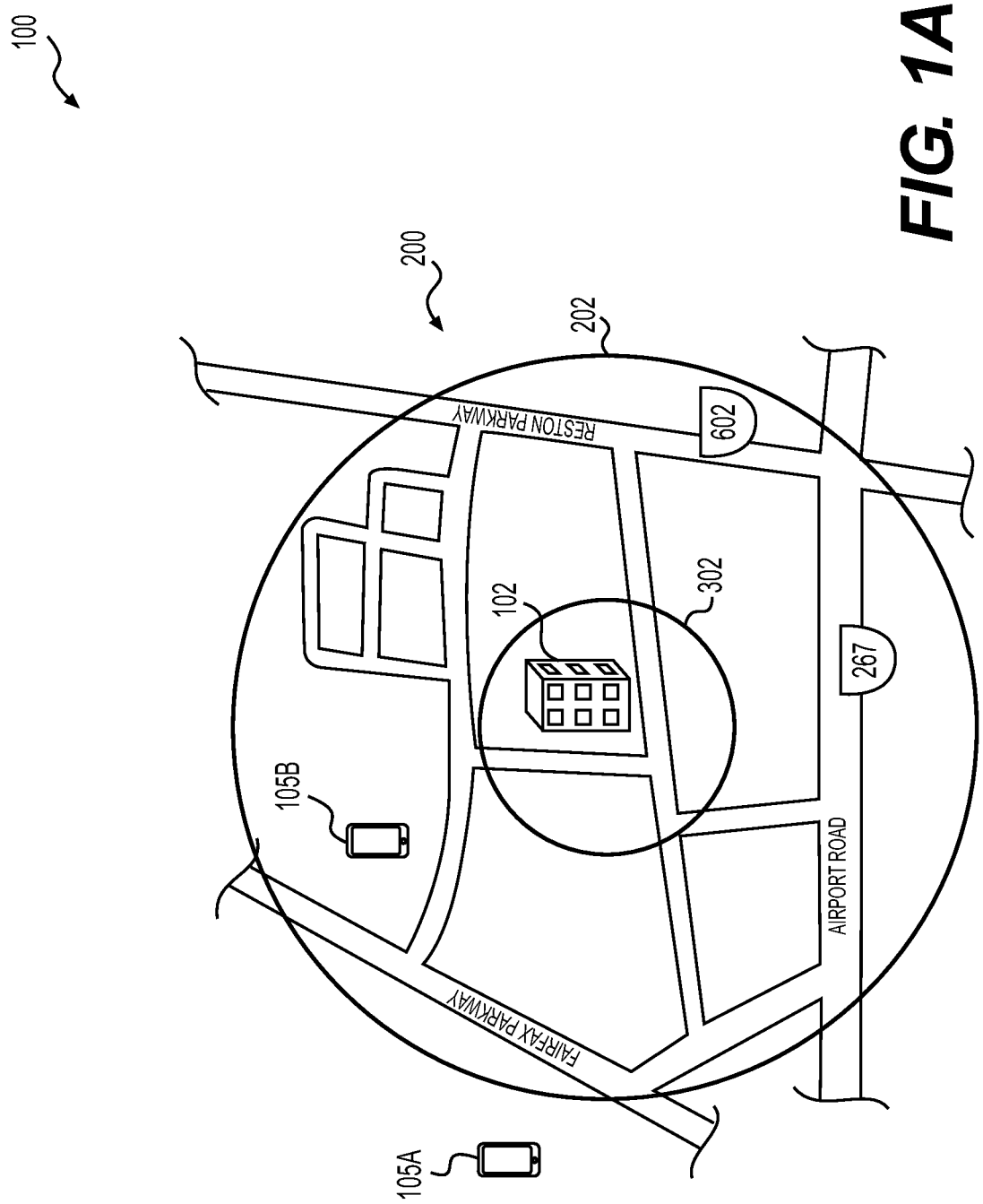
FIG. 1A is an illustration of an electronic map overlaid by a geofence or geographic zone having an outer boundary and an inner boundary, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for detecting the location of an electronic device to determine the geographic location of a user, and presenting the user with electronic content based on the determined location. Specifically, the present disclosure describes methods and systems for presenting electronic content to a user based on, e.g., the user's geographic location relative to a predefined geographic zone, such as a geofence, associated with a geographic location, business, POI, or any other location. In some embodiments, methods and systems are disclosed for presenting electronic content to a user based on the user's geographic location (e.g., detected via the user's device location) relative to a retail location (e.g., a "brick and mortar"), a road location (e.g., a highway exit or road intersection), a public venue (e.g. a stadium or theater), a commercial building, or any another point of interest.

As described above, one method for targeting mobile content and/or advertising is through the use of a simple geofence, typically a fixed radius around a given point. Although fast and simple, this method can undesirably include individuals already in the store, in the parking lot, or within eyesight of the store. However, these individuals might not desire additional advertising incentives, such as coupons, to be motivated to patronize the store. As a result, according to certain embodiments, systems and methods are described for creating geofences that include nearby individuals who are prospective customers but exclude individuals who are already, or are likely soon to be, customers. Accordingly, systems and methods are described for creating geofences having, not only an outer perimeter (within which individuals are targeted for content delivery), but also an inner boundary around the target POI (e.g., store), within which individuals are excluded from targeted content delivery.

In one embodiment, methods and systems are disclosed for presenting electronic content to a user also based on the user's ability to travel to a particular physical location related to the electronic content within some predetermined travel time and/or distance. For purposes of illustration, if a user's device is detected within an outer perimeter or geofence extending over all of the road lanes from which the user can reach the target location within some upper predetermined travel time or distance, then the user may be presented with electronic content related to the target location. However, if the user's device is detected within an inner boundary or geofence extending over all the road lanes from which the user can reach the target location within some lower predetermined travel time or distance, then the user may be excluded from delivery of the targeted electronic content. As will be described in more detail below, either or both of the inner and outer boundaries may be defined by such driving time and/or distance parameters, and either or both of the inner and outer boundaries may be defined by a simple radius, as desired.

In still further embodiments, methods and systems are disclosed for dynamically adjusting a geofence based on date, time, event, feedback (e.g. assessment that too many or too few users are viewing, converting, and/or activating, etc.), and/or user interaction with content delivered to users. For purposes of illustration, a content provider may send a request to a content server identifying a desired value of 250 new users per hour between 8:00 AM and 6:30 PM in a target geographic region. The content server or any other server in communication with the content server may determine the size and density of the number of individuals within the outer perimeter or geofence, but outside of the inner boundary or geofence, at different times during the day and adjust the size or other geometry of each of the outer perimeter and inner boundary, so that the content is presented to the desired number of individuals per hour throughout the requested time range.

In further embodiments, a system may be configured to detect an electronic content conversion, such as by determining that a transmission of an advertisement within the geofence to a user's device led to the presence of the user's device at the target location. In some embodiments, the presence of the user's device may be determined by either using a beacon at the target location or by using another hyper-local presence detection means corresponding to the target location.

FIG. 1A is an illustration of an electronic map 100 including a generally annular geofence 200 in the vicinity of an exemplary target location 102. As used herein, the term "geo-fence" or "geofence" may include a virtual geographic zone having one or more perimeters and an area within the perimeter(s). The geofence may or may not be visible to a user viewing an electronic map, but for illustrative purposes, FIG. 1 depicts a geofence 200 superimposed over the electronic map 100. The target location 102 may be defined by any type or combination of GPS coordinates, address, road intersection, building, business, POI, venue, public space, or any other location of interest. The geofence 200 may have any predefined radius and may be positioned at, or at any suitable distance from, the target location 102. In one embodiment, the geofence 200 may be centered around the target location 102. In another embodiment, the geofence 200 may be centered at an intersection selected near the target location 102. In yet another embodiment, the geofence 200 may be centered at any other point or related point within some predetermined distance from the target location 102.

According to aspects of the present disclosure, the geofence 200 may include both an outer boundary 202 and an inner boundary 302. In one embodiment, the outer boundary 202 may define an inclusion area and the inner boundary 302 may define an exclusion area, such that the geofence 200 is bounded, at an outer perimeter, by outer boundary 202, but also around the target location 102 by inner boundary 302. In other words, the geofence 200 may include the area extending from inner boundary 302 to outer boundary 202, but may exclude the area inside inner boundary 302. While FIG. 1A depicts the outer and inner boundaries 202, 302 as being substantially circular, and depicts the geofence 200 as being substantially annular, it should be appreciated that the outer and inner boundaries 202, 302 and the geofence 200 may each have any shape, such as a square, a rectangle, polygon, an irregular shape, etc., whether defined by one or more parameters, by a content provider or advertiser, by geographical boundaries, and/or by any other inputs.

As will be discussed in detail below, the geofence 200 may be generated according to parameters provided by one or more advertisers or electronic content providers and used to target users within the area defined by the geofence with relevant electronic content. In one embodiment, the geofence may be generated according to instructions received from an owner, operator, or other affiliate of the target location 102. Alternatively or additionally, the geofence may be generated according to parameters defined by an advertising network, mapping service, and/or geofencing service provider. The geofence 200 may include any area between the outer and inner boundaries 202, 302, including one or more portions of various routes on the electronic map 100, such as highways having one or more exits and exit ramps, roads, such as local roads, intersections, or any other navigational or geographic points of interest.

In one embodiment, the geometry or properties (e.g., radius and location) of the geofence 200 may be predetermined by the owner, operator, or other affiliate of the target location 102. The geofence 200 may be used by the owner, operator, or other affiliate of one or more locations, such as target location 102, to present users within the geofence 200 with electronic content related to the target location 102. For example, an owner of a restaurant at location 102 may use geofence 200 to identify users within a certain radius or threshold distance (e.g., a geodesic distance) from the restaurant and send electronic content to users travelling within the geofence 200 (e.g., within outer boundary 202 but not within inner boundary 302) via one or more servers. For purposes of illustration, the restaurant owner or operator may transmit electronic coupons and/or advertisements to users traveling within the restaurant's geofence, to entice those nearby users to visit the restaurant. As shown in FIG. 1A, geofence 200 may include, and cause the transmission of relevant content to, any user traveling within the geofence 200, e.g., within outer boundary 202 but not within inner boundary 302. As a result, according to certain embodiments, content may be delivered to users who are within some desired distance or time of the target location 102 (e.g., within outer boundary 202), but who are not so close as to be beyond the need, desire, or effectiveness for further advertising or promotion regarding the target location 102 (e.g., within inner boundary 302, and perhaps even at or within the target location 102).

Thus, with reference to the geofence of FIG. 1A, electronic advertising or content would not be delivered to mobile device 105A since it is not located within the outer boundary 202 defining the inclusion area. However, electronic advertising or content would be delivered to mobile device 105B since it is located within the outer boundary 202 defining the inclusion area, but not located within the inner boundary 302 defining the exclusion area. Finally, electronic advertising or content would not be delivered to a mobile device within the inner boundary 302, such as within target location 102, since it would be inside the exclusion area defined by inner boundary 302.

The target location 102 may be defined by any type or combination of GPS coordinates, address, road intersection, building, business, POI, venue, public space, or any other location of interest. Although shown as a circle in FIG. 1, each geofence 200 and/or outer/inner boundary 202, 302 may have any suitable size, configuration, and/or shape and may be positioned at, or any suitable distance from, the target location 102. In one embodiment, each geofence 200 and/or outer/inner boundary 202, 302 may be centered around the target location 102, such as a city center, but may be positioned around any location, and be of any scale (e.g. building, block, neighborhood, campus, county, state, etc.) In another embodiment, each geofence 200 and/or outer/inner boundary 202, 302 may be centered at a location selected near the target location 102 such as an associated intersection, highway, POI, etc. In yet another embodiment, the geofence 200 and/or outer/inner boundary 202, 302 may be centered at any other point or related point within some predetermined distance from the target location 102. As will be discussed in detail below, each geofence 200 and/or outer/inner boundary 202, 302 may be generated according to parameters provided by one or more advertisers or electronic content providers and used to target users within the area defined by each geofence 200 with relevant electronic content. In one embodiment, each geofence 200 may be generated according to instructions received from an owner, operator, or other affiliate of the target location 102. Alternatively or additionally, the geofence may be generated according to parameters defined by an advertising network, mapping service, and/or geofencing service provider.

Figure 1B:
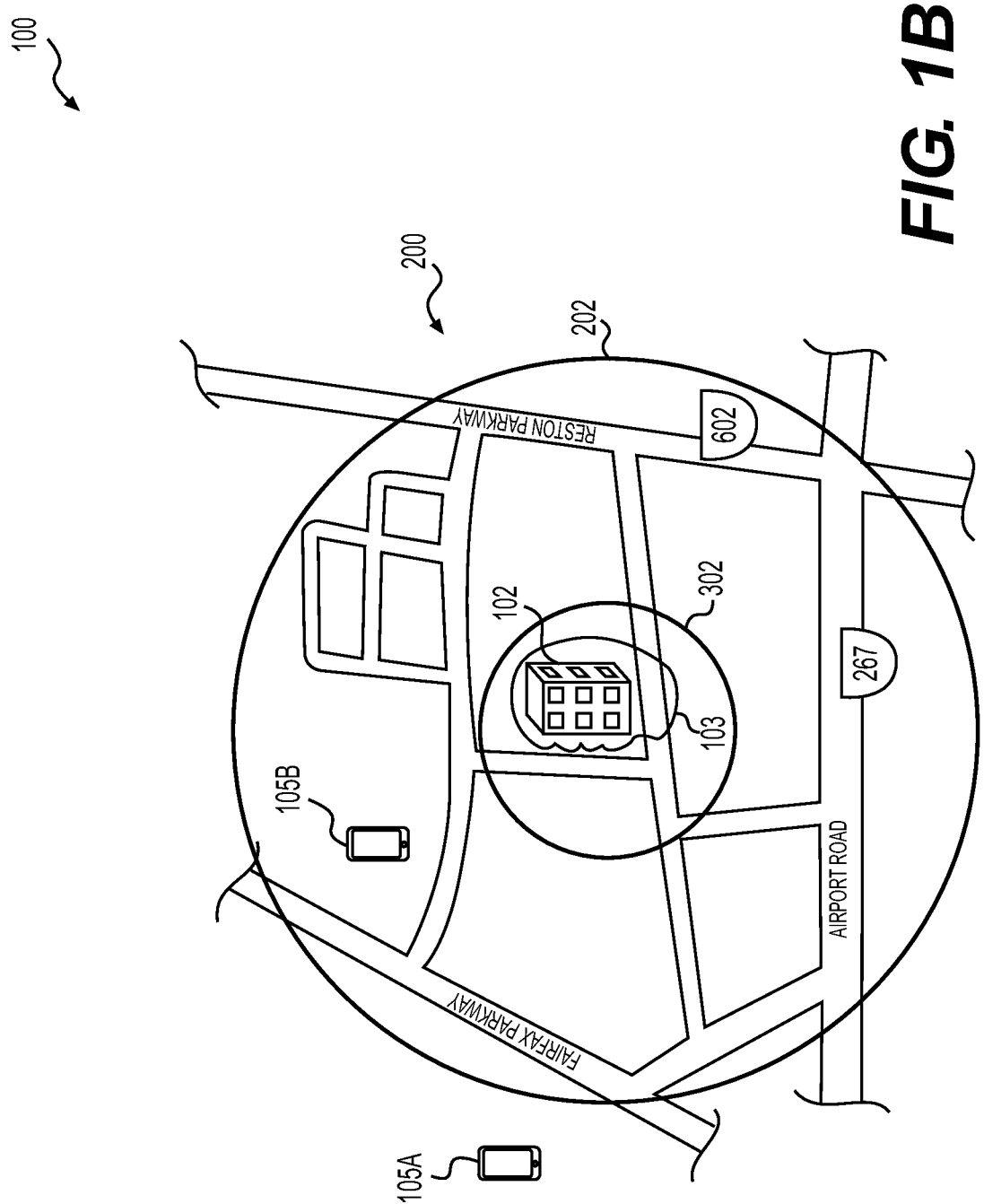
FIG. 1B is an illustration of an electronic map overlaid by a geofence or geographic zone and containing a target geographical zone, according to an exemplary embodiment of the present disclosure.

FIG. 1B depicts an electronic map 100 having a boundary 103 surrounding target location 102, within inner boundary 302. Boundary 103 may define a target geographical zone, for example, a region in which the detection of a presence of a device is deemed to be equivalent to presence at the target location. A target geographical zone is explained in further detail below with respect to method 550.

FIG. 2 depicts an electronic map 100 having a geofence defined by an outer boundary 204 (e.g., defining an inclusion area) and an inner boundary 304 (e.g., defining an exclusion area). In this example, inner boundary 304 may extend some predetermined radius from target location 102, whereas outer boundary 204 (shown covering the shaded roads) may cover a plurality of roads or other lanes of traffic or transportation routes including points from which an individual is within a predetermined threshold of travel time and/or distance from the target location 102. For example, outer boundary 204 may cover any portions of roads or other transportation routes where individuals at those portions are within, e.g., 10 minutes from target location 102 or 5 miles from target location 102. Of course, the predetermined travel times and/or distances may be set to any amount, no matter how low (e.g. within seconds of feet from target location 102) or high (e.g., within hours or miles from target location 102). In the example of FIG. 2, electronic content and/or advertising may be delivered to individuals determined to be inside the inclusion area (e.g., within outer boundary 204 and therefore within some predetermined travel time and/or distance), but outside of the exclusion area defined by inner boundary 304 (e.g., no closer than some predetermined radius from target location 102).

FIG. 3 depicts an electronic map 100 having a geofence defined by an outer boundary 206 (e.g., defining an inclusion area) and an inner boundary 306 (e.g., defining an exclusion area). In this example, outer boundary 206 may extend some predetermined radius from target location 102, whereas inner boundary 306 (shown covering the shaded roads) may cover a plurality of roads or other lanes of traffic or transportation routes including points from which an individual is within a predetermined threshold of travel time and/or distance from the target location 102. For example, inner boundary 306 may cover any portions of roads or other transportation routes where individuals at those portions are within, e.g., 5 minutes from target location 102 or 1 mile from target location 102. Of course, the predetermined travel times and/or distances may be set to any amount, no matter how low (e.g. within seconds of feet from target location 102) or high (e.g., within hours or miles from target location 102). In the example of FIG. 3, electronic content and/or advertising may be delivered to individuals determined to be inside the inclusion area (e.g., within outer boundary 206 and therefore within some radius from target location 102), but outside of the exclusion area defined by inner boundary 306 (e.g., no closer than some predetermined travel time and/or distance).

Of course, it should be appreciated from the description of FIGS. 1-3 that any of the inner boundaries and outer boundaries may be of any type, configuration, and/or shape. For example, both the inner and outer boundaries may be defined by radii or other lengths or shapes relative to target location 102. Alternatively, both the inner and outer boundaries may be defined by travel times and/or distances relative to target location 102. Alternatively, the inner boundary may be defined by a radius or distance from target location 102, whereas the outer boundary may be defined by a travel time and/or distance relative to target location 102. Alternatively, the inner boundary may be defined by a travel time and/or distance relative to target location 102, whereas the outer boundary may be defined by a radius or distance from target location 102.

Figure 4:
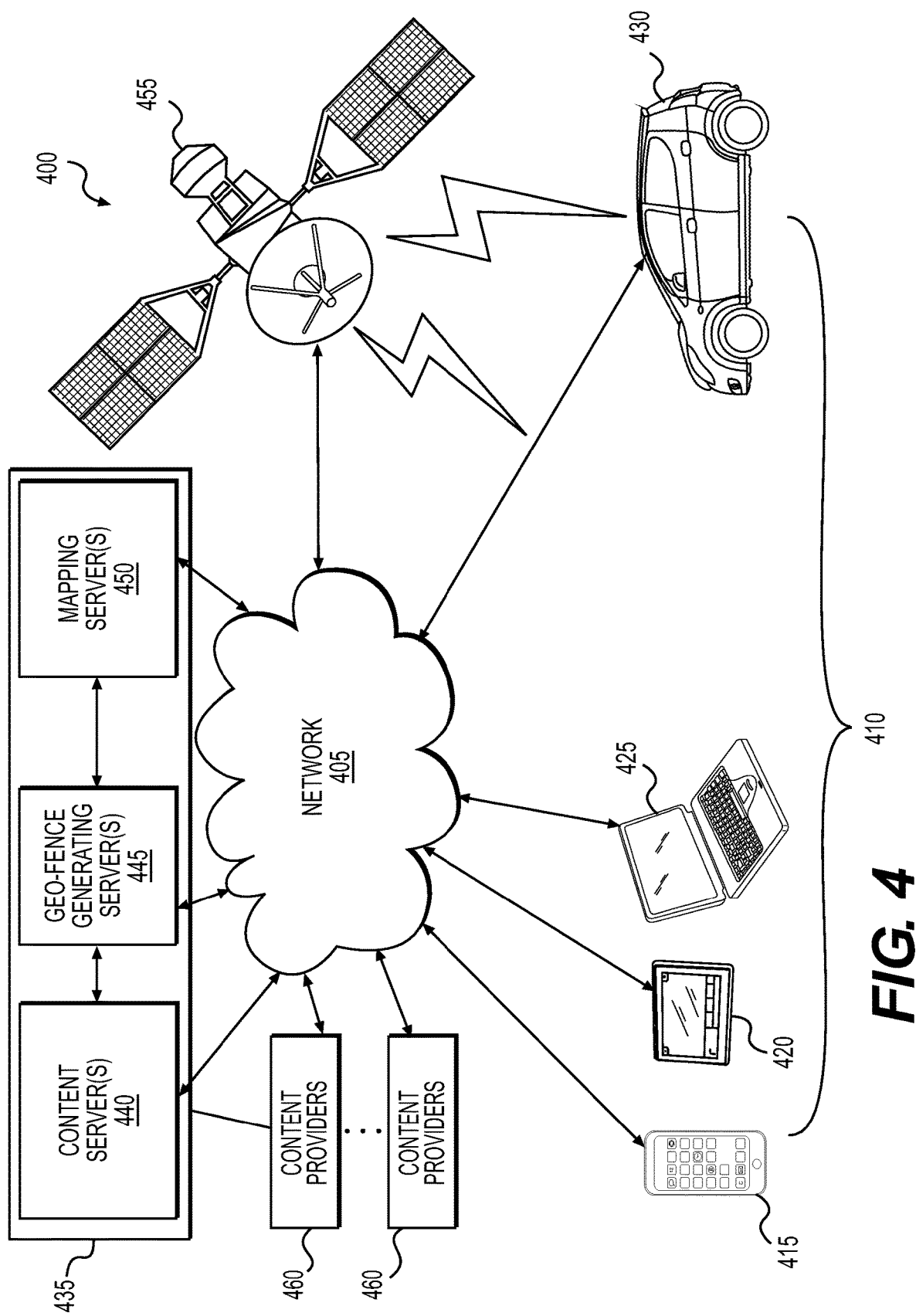
FIG. 4 is a block diagram of a communications environment and systems configured to generate and display electronic content to individuals in a geographic zone having at least an inner boundary, according to an exemplary embodiment of the present disclosure.

FIG. 4 is an illustration of an exemplary environment 400 in which content may be presented to a user's mobile electronic device 410 having GPS and/or a mapping software application. The mobile electronic device 410 may be any device connected to, or capable of connecting to a network 405, such as the Internet. Examples of such mobile electronic devices 410 may include mobile phones 415, in-car or portable GPS devices 420 and 430, computers 425 (e.g., laptops and tablets), smart watches, etc. The mobile electronic devices 410 may send and receive information via the network 405 and/or one or more satellites 455. The mobile electronic devices 410 also may communicate with a system of servers 435 via the network 405. The system of servers 435 may include one or more servers, such as content server(s) 440, geofence generating server(s) 445, and/or mapping server(s) 450 in communication with each other. In addition, the system may include one or more content providers 460 in communication with the server system 435. Examples of content providers may include advertisers, news agencies, government agencies, publishers, etc.

The content server 440 may include a database of parameters received from one or more content providers 460 for sending content to users within a geofence, such as any of the geofence types described with reference to FIGS. 1-3, or the like. Such parameters may include parameters related to the geofence, demographic characteristics of users, and/or any other suitable parameters, or combination of parameters. Examples of parameters related to the geofence may include a travel distance and/or time from the target location, travel direction, travel speed, type of route (e.g., highway, tollway, road, local road, etc.). Examples of parameters related to the demographic information of a user may include vehicle type, average speed of the user, past online search history, driving habits, etc. Examples of other content parameters the content server 440 may receive from one or more content providers 460 may include weather conditions, date, day, time, etc., any of which may be used to control whether and how to transmit electronic content and/or advertising to user devices identified within one or more geofences. For example, for purposes of illustration, a fast food chain may wish to deliver promotional coupons to individuals who are within 5 miles of each of their stores, but not to users who are already in or right next to their stores. The fast food chain might add parameters regarding the time of day for delivery, demographic profiles of targeted individuals, and so on. As another example, a golf course might wish to deliver a promotion to any individuals within 25 miles of the course, but not to individuals who are already on the course, or within a mile of the course. Again, the golf course may add additional parameters, such as to only display the promotion during certain days of the week, or during certain weather patterns, or to certain demographics of individuals. As another example, in the days or weeks preceding Independence Day, a fireworks store in one state might wish to send an online ad and/or coupon to users travelling on a highway within 10 minutes travel time to the closest highway exit to the fireworks store in a direction towards another state where there is a higher state tax or prohibition on fireworks. Of course, it should be appreciated that any type of business or entity might target geofences to any combination of roads or intersections or locations, at any desired day or time, to target any desired segment of the population, with any relevant electronic content and/or ads. The parameters received by the content server 440 may be processed by the content provider 460 and saved in a database, which may be accessed by the one or more geofence generating servers 445.

The geofence generating server(s) 445 may generate one or more virtual electronic geofences based on the parameters received by the content server 440 and may retrieve relevant mapping information from the mapping server 450 in order to accurately generate the geofence in accordance with the parameters received from the content provider 460. According to various embodiments, the geofence generating server(s) 445 may generate, maintain, and implement any number of geofences, simultaneously, for any number of roads and/or intersections, businesses, promotions, etc. Each geofence, inner boundary, and/or outer boundary maintained by the geofence generating server(s) 445 may have any desired shape, such as the shapes depicted in FIGS. 1-3, the shape of an annular donut (e.g., a "geodonut"), the shape of portions of one or more road or highway lanes, the shape of an intersection, the shape of a plurality of road/intersection portions, a polygon (or plurality thereof), a rectangle (or plurality thereof), etc. In one embodiment, the geofence generating server(s) 445 may generate the one or more geofences based on inputs received from content server(s) 440, mapping server(s) 450, content provider(s) 460, or any other publishers, advertisers, etc. The geofence generating server(s) 445 may, in combination with the mapping server(s) 450, monitor the location of one more users' devices relative to perimeter/area information associated with each geofence (e.g., relative to both the inner and outer boundaries) to generate and maintain an updated list of the devices that enter and remain within each geofence (e.g., that are within the outer boundary but not within the inner boundary).

The mapping server 450 may store and process information regarding road geometry, road intersections, routing graphs, traffic patterns, road closures, event information, average traffic speed, etc. In addition, the system may be in communication with the electronic devices 410 via the network 405 and/or satellite(s) 455 to receive location, travel, and any other user information that may be used to generate geofences and identify devices within each geofence in accordance with the content parameters. For illustrative purposes only, the server system 435 is shown in FIG. 4 to include servers 440, 445, and 450 in a unitary structure, however, it should be understood that any or all of the servers 440, 445, and 450 may be external to each other and owned and/or operated by different entities, as long as electronic communication may occur within one or more of the servers 440, 445, and 450. Any of servers 440, 445, and 450 may operate in conjunction with each other, and/or perform the functions of each other.

Figure 5A:
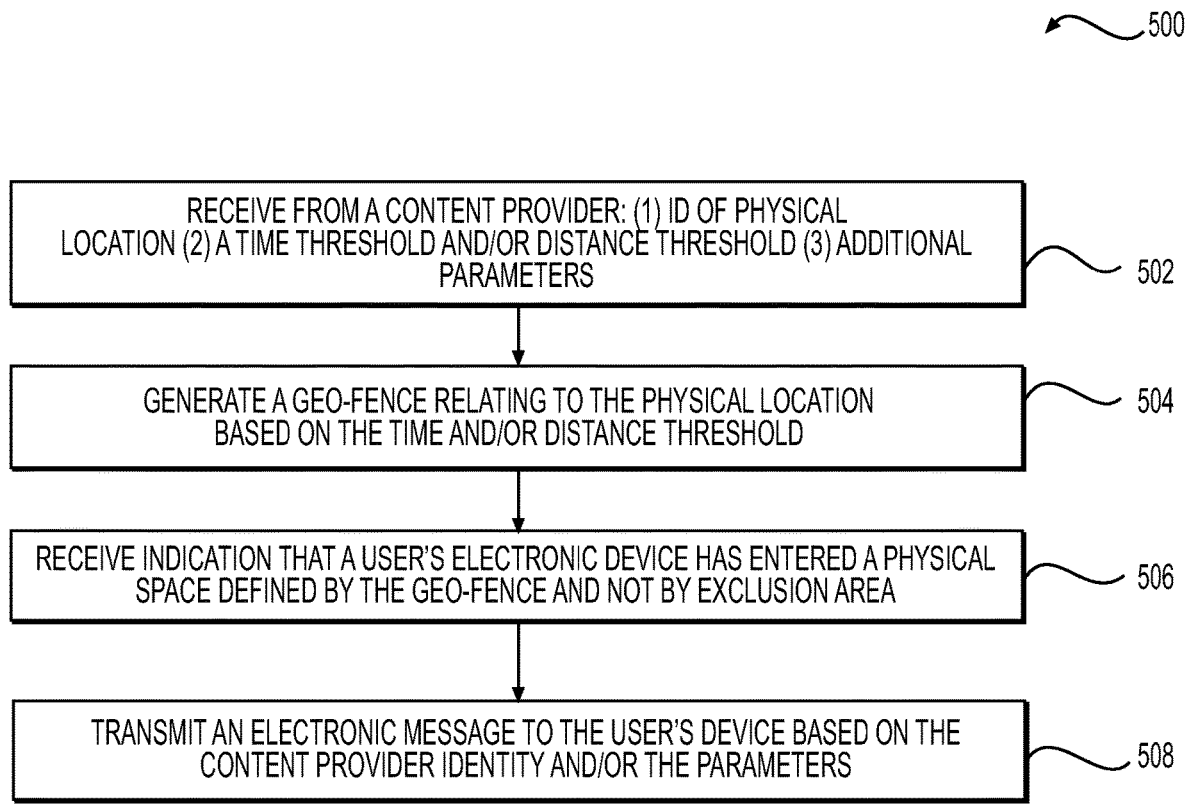
FIG. 5A is a flow diagram of methods for presenting electronic content to individuals in a geographic zone having at least an inner boundary, according to exemplary embodiments of the present disclosure.

FIG. 5A is a flow diagram of a method 500 for presenting online content to a user. The method 500 may include a step 502 of receiving, from a content provider 460, an identification of one or more parameters for displaying electronic content and/or advertisements to users. The content provider 460 may be an advertiser or other content publisher as discussed above. The parameters may be any suitable parameters such as, e.g., an identification of a physical location, a time threshold, and/or distance threshold, and any other additional parameters, such as user demographics, time-of-day parameters, promotions, inner/outer boundary preferences, etc. The location parameters may include a physical location (e.g., street address, highway exit, map coordinates, etc.) and a predefined threshold distance, and/or travel time to the physical location. The physical location may be the physical location of an entity or business related to the electronic content and/or advertising or another location close to the entity relation to the online content (e.g., the closest highway exit to the entity, the closest major intersection to the entity, etc.)

The threshold parameter, used for either the inner and/or outer boundaries, may be any suitable value, e.g., about 1 to 5 miles of travel distance, about 3 to 10 minutes travel time (by driving, walking, etc.), and so on. The user demographic information may include the type of vehicle, age, gender, interests, income, category, number of travelers with the user, etc. For example, a restaurant may wish to advertise its lunch buffet to users within 3 miles of the restaurant's physical address or 3 miles from the closest highway exit to the restaurant, but not to users inside or within x-feet of the restaurant, and may wish to target advertisements to users driving in large capacity vehicles (e.g., buses, vans, etc.) and therefore provide these parameters to the content server(s) 440.

A geofence may be generated at step 504 by a geofence generating server 445 or any other suitable entity. The dimensions and properties (e.g., shape, geometry, number) of the geofence may be based on the parameters electronically received at step 502. For example, as described above with respect to FIG. 2, the geofence may be generated for a particular target location 102 so as to cover an area extending between an inner boundary (which itself surrounds the target location 102) and an outer boundary (which may entirely or partially surround the target location 102 and/or the inner boundary). Alternatively, as described above with respect to FIGS. 2 and 3, the geofence may be generated so as to cover some or all of the road portions within some predetermined travel time and/or travel distance from a particular target location or entity, either as an inclusion area or exclusion area. A geofence may be generated at step 504 by a geofence generating server 445 or any other suitable entity. The dimensions and properties (e.g., shape, geometry, number) of the geofence(s) may be based on the parameters electronically received at step 502 by the content server 440. In addition, the geofence generating server 445 also may be in communication with the mapping server 455 to retrieve mapping information such as geographic borders (e.g. city, county, state, etc.), natural borders (e.g. mountains, rivers, lakes, etc.) for use in generating the geofence. The geofence generating server 445 may also electronically receive data from other servers for use in generating the geofence based on any other parameters identified in the request at step 502.

At step 506, one or more of the servers 435 may generate or receive an indication that a user's electronic device has entered a physical space defined by the geofence. For example, the geofence generating server 445 and/or mapping server(s) 450 may determine the location of a user's mobile electronic device 410, via the network 405 and/or satellite(s) 455, relative to a stored perimeter and/or area associated with each of a plurality of known geofences. According to aspects of the present disclosure, the determination may be made: first, as to whether the user's device 410 is located within an outer boundary of the geofence (e.g., within the inclusion area), and second, as to whether the user's device 410 is located within an inner boundary of the geofence (e.g., not within the exclusion area). According to certain aspects of the present disclosure, the method may be configured to proceed upon determining that the user's electronic device 410 is indeed located within the inclusion area defined by the outer boundary of the geofence, but not located within the exclusion area defined by the inner boundary of the geofence. The user's electronic device 410 may be detected by accessing GPS data or any other suitable method (e.g., Wi-Fi triangulation, etc.) of detecting the location of the electronic device 410 within the geofence parameters. The indication may be an electronic request sent by the geofence generating server 445 to the content server via the network. The indication may include any additional information about the user received via the user's electronic device 410, such as previous map searches, demographic information, etc. In addition, the indication may be generated and sent by the user device's operating system.

At step 508, the content server 440 may send electronic content and/or advertisements provided by the content provider 460 via the network 405 to the user's electronic device 410 based on the parameters identified by the content provider 460 at step 502. As described above, the electronic content and/or advertisements may include, by way of example, electronic coupons, electronic promotions, recommendations, product/service rankings, sponsored content, opinion content, advertisements, any of which may be embodied in any type or combination of text, graphics, animation, video, one- or two-dimensional barcodes, unique identifiers, electronic messages (e-mail, SMS, etc.), mobile application notification, etc. As described above, the electronic content and/or advertising may be related to the products, services, or other business of the owner, operator, or affiliate of the target location associated with the respective geofence. For example, when a user's device enters the physical space defined by a geofence requested or sponsored by a department store (e.g., in the inclusion area but not the exclusion area), the user may be presented with an advertisement or promotion for the user to purchase goods from the department store. When a user's device enters a portion of a highway or road (preceding an exit or intersection) covered by a geofence requested or sponsored by a gas station, restaurant, or hotel, the user may be presented with an advertisement or promotion for the user to purchase goods or services associated with the gas station, restaurant, or hotel, respectively.

At step 508, the content server 440 may automatically send electronic content and/or advertisements provided by the advertiser/content provider 465 via the network 305 to the user's electronic device 110 based on the parameters identified by the advertiser/content provider 465 at step 502. As described above, the electronic content and/or advertisements may include, by way of example, coupons, promotions, recommendations, product/service rankings, sponsored content, opinion content, advertisements, any of which may be embodied in any type or combination of text, graphics, animation, video, one- or two-dimensional barcodes, unique identifiers, and/or electronic messages (e-mail, SMS, etc.), mobile application notification, etc. As described above, the electronic content and/or advertising may be related to the products, services, or other business of the owner, operator, or affiliate of the target location associated with the respective geofence. For example, when a user's device 110 enters the physical space defined by a geofence requested or sponsored by a department store (e.g., in the inclusion area but not the exclusion area), the user may be presented with an advertisement or promotion for the user to purchase goods from the department store.

Figure 5B:
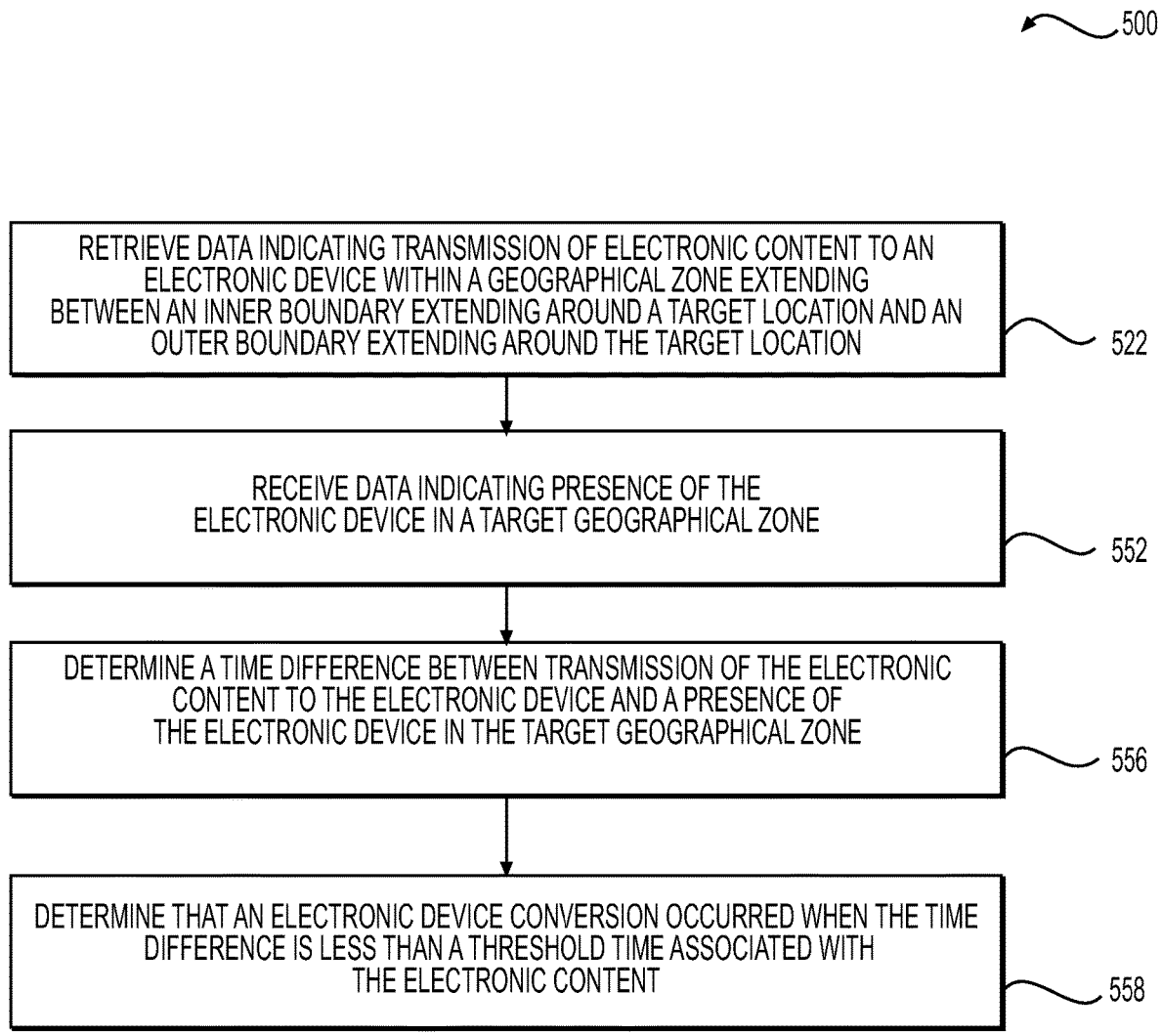
FIG. 5B is a flow diagram of methods for detecting an electronic content conversion, according to exemplary embodiments of the present disclosure.

FIG. 5B is a flow diagram of a method 550 for detecting an electronic content conversion. For example, method 550 may aid in determining whether transmission of an advertisement as electronic content by method 500 leads users to visiting the target locations.

The method 550 may include a step 552 of retrieving data indicating transmission of electronic content to one or more electronic devices within a geographical zone extending between an inner boundary extending around a target location and an outer boundary extending around the target location. For example, whenever electronic content is transmitted to an electronic device, information related to the transmission may be stored in one or more databases (not illustrated) in servers 435. The stored information may include but is not limited to, identity of devices to which particular content is transmitted, time of transmission to these particular devices, information related to additional characteristics of devices or users associated with the devices to which electronic content is transmitted, and preferred time thresholds for a conversion of an advertisement. For example, if the device appears in a region associated with the target after receiving an advertisement it may be considered to be an indication that a user carrying the device has arrived in the region associated with the target in response to receiving the transmitted electronic content.

In step 554, method 550 may include receiving data indicating presence of an electronic device in a target geographical zone. Specifically, one or more of the servers 435 may receive an indication that a user's electronic device has entered a target geographical zone. The target geographical zone may be defined by parameters indicating that the device is close to the target, at the target, or within the vicinity of the target. In some embodiments, the target geographical zone is located within the inner boundary of the region in which the electronic content is transmitted.

Accordingly, one or more servers 435 may receive data indicating that the user device is within the target geographical zone based on using a hyper-local geofence and/or by using beacon detection. For example, the data may indicate the presence of a device is within a region based on a geofence around the target, serving as the target geographical zone, which may be defined by application of similar concepts as method 500. Accordingly, geofence generating server 445 and/or mapping server(s) 450 may determine the location of a user's mobile electronic device 410, via the network 405 and/or satellite(s) 455, relative to a stored perimeter and/or area associated with each of a plurality of known geofences affiliated with target locations. The user's electronic device 410 may be detected by accessing GPS data or any other suitable method (e.g., Wi-Fi triangulation, etc.) of detecting the relatively precise location of the electronic device 410 within the geofence parameters, such as target geographical zone 103. The indication may include any additional information about the user received via the user's electronic device 410, such as previous map searches, demographic information, etc. In addition, the indication may be generated and sent by the operating system of the user's device.

In an alternative embodiment, the target geographical zone may be defined by using beacon detection, which, for example, may define a region in which a user's device may connect to another device associated with a target. For example, a Wi-Fi router may be associated with a target location. Therefore, any area from which a device may connect to the Wi-Fi router may be defined as the target geographical zone. The various types of connections that may define a target geographical zone may include Wi-Fi, near field communications (NFC), and Bluetooth. In additional embodiments, Bluetooth Low Energy (BLE) beacons may be utilized. For example, devices, such a mobile phone, using a location determination protocol may define the target geographical zones.

In step 556, method 550 may include determining a time difference between transmission of the electronic content to the electronic device and a presence of the electronic device in the target geographical zone. For example, the data retrieved from a database (not illustrated) in servers 435 may indicate the time that a particular advertisement was transmitted as electronic content to a particular device at a particular time. Server 435 may also determine or receive information/indication related to the presence of a user device in the target geographical zone including the time that a device's presence is first detected. Information related to a user device is not limited to the device's initial detection, but may include continuous tracking of the device within the target geographical zone, including physical movement, spending behavior, etc. For example, a database (not illustrated) in servers 435 may contain information regarding the time that an advertisement was transmitted to user device 1058 between inner boundary 302 and outer boundary 302. That information may be used along with the time that user device was first detected to be presented in target geographical zone 103 to determine the time difference.

In step 558, method 550 may include determining that an electronic device conversion occurred when the time difference is less than a threshold period of time associated with the electronic content. Specifically, the time difference between the transmission of electronic content to a particular device and the detection of that particular device in the target geographical zone is compared to a threshold period of time associated with the electronic content. In some embodiments, the threshold period of time may be a user selection.

Alternatively, it may be a function of various factors such as traffic patterns, traffic detection, and timings. For example, advertisements transmitted at different times may have different threshold periods of time for the same electronic content. For, example it may be determined that during rush hour traffic on a highway from 3-5 p.m., it may take a user up to an hour to reach the target location after receiving the advertisement. In that scenario, the threshold period of time may be an hour, while at other times with an expected normal traffic flow, the threshold period of time may be lower. Similarly, on particular days, such as weekends or holidays, the threshold period of time may vary. Accordingly, in some embodiments, the threshold period of time may be dependent on various factors such as transmission of advertisements. In other embodiments, the threshold period of time may be a function of various algorithms. For example, there may be live monitoring of traffic, a function of unique thresholds for different regions within the geofence where transmission occurs. As a more specific example of the threshold time being a function of unique thresholds for different regions within the geofence where transmission occurs, a coffee shop may advertise to users located within a particular geofence that includes roads and a grocery store. It is likely that user devices that receive the transmission while at the grocery store will continue to shop and then proceed to the coffee shop based on seeing the advertisement. However, someone on the road may proceed comparatively more quickly to the coffee shop in response to receiving an advertisement.

Figure 6:
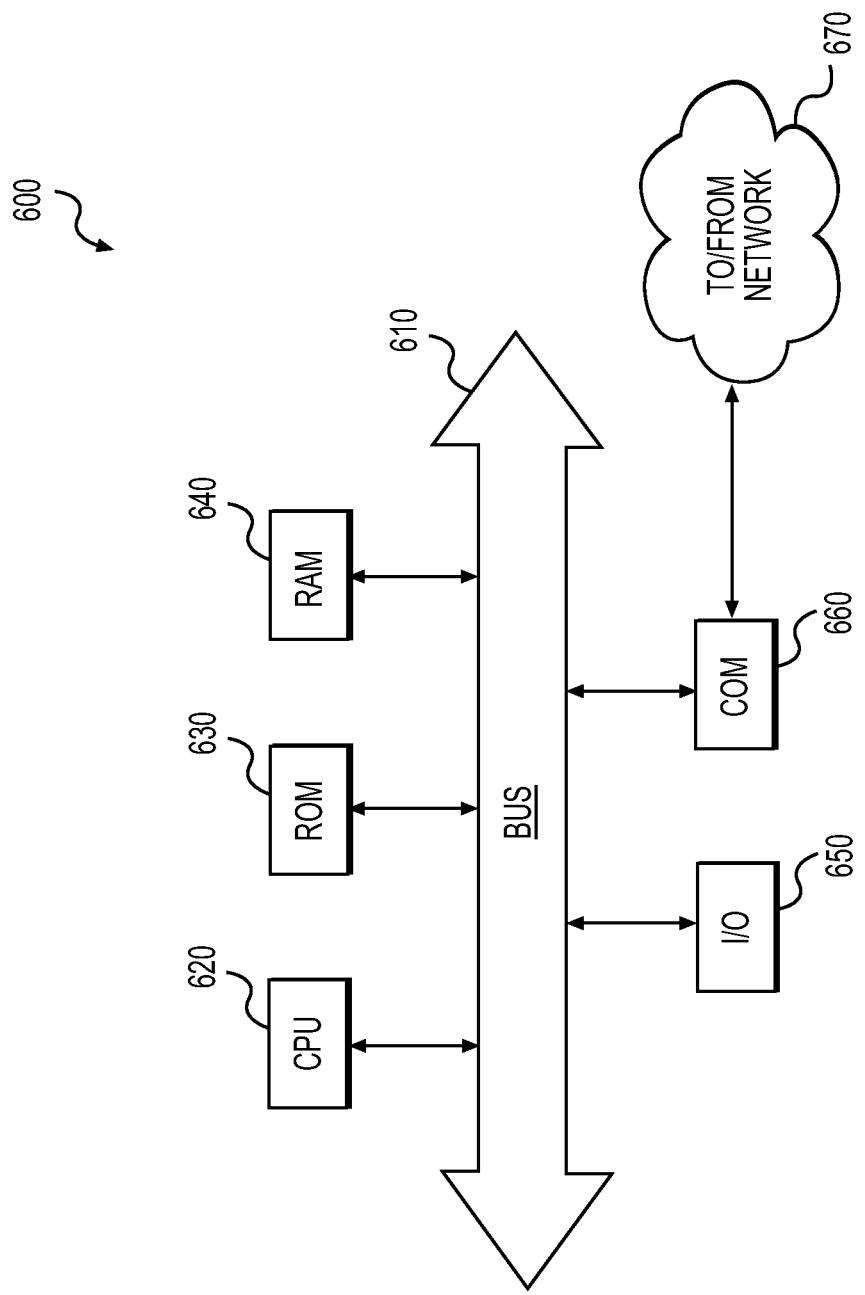
FIG. 6 is a simplified functional block diagram of a computer configured as a content, geofence generating, and/or mapping server, for example, for presenting electronic content to individuals in a geographic zone having at least an inner boundary, according to exemplary embodiments of the present disclosure.

FIG. 6 provides a functional block diagram illustration of computer hardware platforms consistent with any of the devices and servers described herein. FIG. 6 illustrates a network or host computer platform 600, as may typically be used to implement a server. It is believed that those skilled in the art are familiar with the structure, programming, and general operation of such computer equipment and as a result, the drawings should be self-explanatory.

A platform for a server or the like 600, for example, may include a data communication interface for packet data communication 660. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640, although the server 600 often receives programming and data via network communications 670. The hardware elements, operating systems, and programming languages of such equipment are conventional in nature, and it is presumed that those skilled in the art are adequately familiar therewith. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the electronic device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for executing an electronic distribution of electronic content to user devices, the method comprising:
   determining a target geographical zone for distribution of electronic content, the target geographical zone corresponding to a travel lane of a roadway or highway within a geographical zone extending between an inner boundary extending around a target location and an outer boundary extending around a target location;
   retrieving data indicating a time of transmission of the electronic content to an electronic device;
   receiving data indicating a time of presence of the electronic device in the travel lane of the roadway or highway comprising the target geographical zone;
   determining a time difference between the time of transmission of the electronic content to the electronic device and the time of presence of the electronic device in the target geographical zone; and
   determining that an electronic device conversion occurred when the time difference is less than a threshold period of time associated with the electronic content, the threshold period of time being based on an estimated travel time from the receiving location of the electronic device to the target geographical zone.

2. The method of claim 1, wherein the target geographical zone is associated with the target location.

3. The method of claim 2, wherein receiving data indicating the time of presence of the electronic device in the travel lane of the roadway or highway comprising the target geographical zone comprises receiving data indicating a time of presence of the electronic device within a geofence defining the target graphical zone.

4. The method of claim 2, wherein receiving data indicating the time of presence of the electronic device in the travel lane of the roadway or highway comprising the target geographical zone comprises receiving data indicating a time of connecting the electronic devices with a device associated with the target location.

5. The method of claim 2, wherein the electronic content relates to an advertiser or content provider affiliated with the target location.

6. The method of claim 2, wherein one or both of the inner boundary and the outer boundary is defined by a radius around the target location.

7. The method of claim 2, wherein one or both of the inner boundary and the outer boundary is defined by a driving time or driving distance to the target location from each of a plurality of points along the respective inner or outer boundary.

8. The method of claim 2, further comprising calculating the threshold period of time based on traffic data.

9. A system for managing an electronic distribution of electronic content to electronic device users, the system comprising:
   a data storage device storing instructions; and
   a processor configured to execute the instructions to perform a method comprising:
      determining a target geographical zone for distribution of electronic content, the target geographical zone corresponding to a travel lane of a roadway or highway within a geographical zone extending between an inner boundary extending around a target location and an outer boundary extending around a target location;
      retrieving data indicating a time of transmission of the electronic content to an electronic device;
      receiving data indicating a time of presence of the electronic device in the travel lane of the roadway or highway comprising the target geographical zone;
      determining a time difference between the time of transmission of the electronic content to the electronic device and the time of presence of the electronic device in the target geographical zone; and
      determining that an electronic device conversion occurred when the time difference is less than a threshold period of time associated with the electronic content, the threshold period of time being based on an estimated travel time from the receiving location of the electronic device to the target geographical zone.

10. The system of claim 9, wherein the target geographical zone is associated with the target location.

11. The system of claim 10, wherein receiving data indicating the time of presence of the electronic device in the travel lane of the roadway or highway comprising the target geographical zone comprises receiving data indicating a time of presence of the electronic device within a geofence defining the target graphical zone.

12. The system of claim 10, wherein receiving data indicating the time of presence of the electronic device in the travel lane of the roadway or highway comprising the target geographical zone comprises receiving data indicating a time of connecting the electronic devices with a device associated with the target location.

13. The system of claim 10, wherein the electronic content relates to an advertiser or content provider affiliated with the target location.

14. The system of claim 10, wherein one or both of the inner boundary and the outer boundary is defined by a radius around the target location.

15. The system of claim 10, wherein one or both of the inner boundary and the outer boundary is defined by a driving time or driving distance to the target location from each of a plurality of points along the respective inner or outer boundary.

16. The system of claim 10, wherein the method further comprising calculating the threshold period of time based on one or more of date, time, and traffic data.

17. A non-transitory computer-readable medium storing instructions, then instructions, when executed by a computer system cause the computer system to perform a method, the method comprising:
    determining a target geographical zone for distribution of electronic content, the target geographical zone corresponding to a travel lane of a roadway or highway within a geographical zone extending between an inner boundary extending around a target location and an outer boundary extending around a target location;
    retrieving data indicating a time of the transmission of electronic content to an electronic device;
    receiving data indicating a time of presence of the electronic device in the travel lane of the roadway or highway comprising the target geographical zone;
    determining a time difference between the time of transmission of the electronic content to the electronic device and the time of presence of the electronic device in the target geographical zone; and
    determining that an electronic device conversion occurred when the time difference is less than a threshold period of time associated with the electronic content, the threshold period of time being based on an estimated travel time from the receiving location of the electronic device to the target geographical zone.

18. The non-transitory computer-readable medium of claim 17, wherein the target geographical zone is associated with the target location.

19. The non-transitory computer-readable medium of claim 18, wherein receiving data indicating the time of presence of the electronic device in the travel lane of the roadway or highway comprising the target geographical zone comprises receiving data indicating a time of presence of the electronic device within a geofence defining the target graphical zone.

20. The non-transitory computer-readable medium of claim 18, wherein receiving data indicating the time of presence of the electronic device in the travel lane of the roadway or highway comprising the target geographical zone comprises receiving data indicating a time of connecting the electronic devices with a device associated with the target location.

* * * * *